US012217218B2

(12) United States Patent
Sedouram (10) Patent No.: US 12,217,218 B2
(45) Date of Patent: Feb. 4, 2025

(54) RENDERING AUGMENTED REALITY CONTENT BASED ON POST-PROCESSING OF APPLICATION CONTENT

(71) Applicant: GOOGLE LLC, Mountain View, CA (US)

(72) Inventor: Ramprasad Sedouram, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 194 days.

(21) Appl. No.: 17/962,795

(22) Filed: Oct. 10, 2022

(65) Prior Publication Data

US 2024/0119423 A1    Apr. 11, 2024

(51) Int. Cl.
| | | |
|---|---|---|
| *G06V 20/20* | (2022.01) | |
| *G06F 3/04842* | (2022.01) | |
| *G06F 3/14* | (2006.01) | |
| *G06F 9/451* | (2018.01) | |
| *G06Q 10/1093* | (2023.01) | |
| *G06T 11/00* | (2006.01) | |

(52) U.S. Cl.
CPC .......... *G06Q 10/1097* (2013.01); *G06F 3/14* (2013.01); *G06F 9/453* (2018.02); *G06T 11/00* (2013.01); *G06V 20/20* (2022.01); *G06F 3/04842* (2013.01)

(58) Field of Classification Search
CPC ....... G06Q 10/1097; G06F 3/14; G06F 9/453; G06F 3/04842; G06F 3/011; G06T 11/00; G06V 20/20; G06V 40/161; G02B 2027/0138; G02B 2027/0141; G02B 27/0172; G02B 2027/0178
See application file for complete search history.

(56) References Cited

U.S. PATENT DOCUMENTS

| | | | |
|---|---|---|---|
| 8,947,322 B1 | 2/2015 | Chi et al. | |
| 9,035,878 B1 * | 5/2015 | Wheeler | G06F 3/03547 345/157 |
| 10,777,094 B1 | 9/2020 | Rao et al. | |
| (Continued) | | | |

OTHER PUBLICATIONS

European Patent Office; International Search Report and Written Opinion issued in Application No. PCT/US2023/034380; 12 pages; dated Mar. 5, 2024

*Primary Examiner* — Jitesh Patel
(74) *Attorney, Agent, or Firm* — Gray Ice Higdon (57) ABSTRACT

Implementations relate to an automated assistant that provides augmented reality content, via a display interface of computerized glasses, resulting from post-processing of application content. The application content can be identified based on prior interactions between a user and one or more applications, and the application content can be processed to determine objects, and/or object classifications, that may be associated with the application content. When the user is wearing the computerized glasses, and the object is detected within a field of view of the computerized glasses, the automated assistant can cause certain content to be rendered at the display interface of the computerized glasses. In some implementations, the content can be generated to supplement, and/or be different from, existing content that the user may have already accessed, in furtherance of preventing duplicative usage of applications and/or preserving computational resources.

20 Claims, 6 Drawing Sheets

(56) References Cited

U.S. PATENT DOCUMENTS

| | | |
|---|---|---|
| 2013/0027430 A1* | 1/2013 | Matsuda ............... G06T 19/006 |
| | | 345/633 |
| 2015/0281119 A1* | 10/2015 | Olkha .................... G06F 21/10 |
| | | 709/225 |
| 2018/0117446 A1 | 5/2018 | Tran et al. |
| 2021/0097776 A1* | 4/2021 | Faulkner ............. G06F 3/04842 |
| 2021/0195013 A1 | 6/2021 | Butcher et al. |
| 2021/0286502 A1* | 9/2021 | Lemay .................. G06T 19/006 |
| 2022/0157027 A1* | 5/2022 | Ma ..................... G02B 27/0093 |
| 2022/0244786 A1 | 8/2022 | Chu et al. |
| 2023/0359315 A1* | 11/2023 | Karunamuni ....... G06F 3/04883 |

* cited by examiner

RENDERING AUGMENTED REALITY CONTENT BASED ON POST-PROCESSING OF APPLICATION CONTENT

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

Some automated assistants can provide notifications to users when certain features of a user's context become apparent to the automated assistant. However, such notifications may only convey information that was created by the user and/or is otherwise readily available to the user upon initializing a particular application. For example, a user that is relying on navigation to reach a destination may receive a notification regarding the operating hours of the destination (e.g., "The library closes at 5 PM."). Moreover, such information that is conveyed by the automated assistant may be globally conveyed to other users who are similarly conducting themselves (e.g., other users may also be presented with operating hours when navigating to the destination). Although such information may nonetheless be helpful, indiscriminately providing such notifications can waste valuable bandwidth (i.e., limited focus) of the user. For example, a user that is actively working to complete a task for their job may not operate any more efficiently upon receiving a notification regarding an upcoming event. However, notifications that reflect a wider breadth of information, which the user has permitted the automated assistant to access, may equip the user with suitable information for making their efforts more efficient.

SUMMARY

Implementations set forth herein relate to an automated assistant that can provide augmented reality content, via a display interface of computerized glasses, resulting from post-processing of application content. The application content can be accessed by the user during an interaction between the user and an application, and the application content can be processed to generate content that can be helpful in certain contexts, such as when a particular object is within a field of view of the computerized glasses. Said another way, the automated assistant can determine that a particular object, and/or object of a particular classification, is within a field of view of the computerized glasses. Based on this determination, the automated assistant can identify and/or generate content to be rendered within the field of view of the computerized glasses (e.g., depending on where the object is) in furtherance of progressing a task that the user may have been working to complete with the application.

As an example, the user can be interacting with a word processing application to complete a report before 5 PM of the following day. The report can be associated with a calendar entry entitled, "Report Presentation," that is accessible via a calendar application. An automated assistant can, with prior permission from the user, access application content generated by the word processing application and/or the calendar application to generate helpful augmented reality content. For example, helpful content can include, but is not limited to, an estimated remaining amount of time to complete the report, an amount of time consumed making certain progress on the report, recommended edits for the report, scheduling conflicts that may occur if the user continues to work on the report, and/or any other content that may be helpful to a user. In some implementations, one or more entries can be generated by the automated assistant for correlating a respective instance of helpful content (e.g., an estimated amount of time remaining to complete the report) with a classification of objects (e.g., clocks) that a user may view within a field of view of computerized glasses. Thereafter, when the automated assistant determines the object, or an object sharing the classification of objects, is within a field of view of the computerized glasses being worn by the user, the automated can render the helpful content at an interface of the computerized glasses.

For example, as the user is interacting with the word processing application during the morning of the day that the report is due (e.g., the report may be due at 5 PM that day), the user can be wearing their computerized glasses. The automated assistant can determine that the user has directed their attention away from the word processing application to view a clock that is hanging on a nearby wall. Said another way, the user can be viewing the word processing application via a computing device (e.g., a laptop computer), and the automated assistant can determine, based on one or more sensors of the computerized glasses, that the user has directed their line of sight away from the computing device and towards the clock. In some implementations, the automated assistant can employ one or more heuristics processes and/or one or more trained machine learning models to classify objects that may be within this field of view of the computerized glasses. The automated assistant can then determine whether the object is associated with an entry associated with the user that is wearing the computerized glasses. For example, the automated assistant can determine that the clock being viewed by the user is associated with an entry that correlates the report being drafted by the user with time measuring devices (e.g., clocks).

In some implementations, when the automated assistant determines that the user is viewing an object that corresponds to a previously generated entry, or other related data, the automated assistant can cause certain content to be rendered at a display interface of the computerized glasses. For example, image data can be generated to convey information to the user to put the user on notice of an estimated amount of time to complete the report prior to the deadline (e.g., 5 PM). The automated assistant can then cause the computerized glasses to render an image that conveys the information generated based on the prior and/or current interactions between the user and the word processing application. The image can include natural language content and/or other visual content, which can, for example, illustrate a stopwatch or status bar actively conveying the amount of time that is left to complete the report prior to the deadline. In some implementations, the image can convey information that is based on multiple sources of data, such as certain calendar events that may intervene between the present time and the time of the deadline, and thus affect an ability of the user to work uninterrupted until the deadline.

In some implementations, the content can be rendered at a location of the display interface that can be dynamically adjusted in real-time according to how the user maneuvers their head and/or otherwise shifts the field of view of the computerized glasses. Alternatively, or additionally, the content that is rendered can be modified according to any features of a context in which the content is being rendered. For example, content rendered over and/or adjacent to a clock can be dynamically rendered such that the content appears to adapt to the passing of time indicated by the clock. In some instances, the content can be a pie-shaped image that overlays a portion of the clock with a callout that has text that states, "Estimated time left to finish the report." In this way, the assistant can assist the user with visualizing an amount of free time they may have before the deadline if they continue to work at their current pace. Alternatively, or additionally, the content can be a pie-shaped image that overlays a portion of the clock with a callout that has text that states, "Estimated amount of free time if you continue working for 45 minutes." In some implementations, the content can be selectable and/or modified to allow the user to visualize other scenarios in which they may work for a different amount of time.

In some implementations, the content can be rendered according to settings that can control any content being rendered at the computerized glasses by the automated assistant. For example, the user may specify, via the settings, that the automated assistant must limit rendering certain types of augmented reality content (e.g., work-related content) to certain times of the day and/or week. In some implementations, the automated assistant can render content according to certain features of an object, such as distance between the user and the object, a size of the object, whether the object includes legible text, ornamental features of the object, functional aspects of the object, and/or any other features that can be used as a basis for rendering content in a particular way. For example, in some circumstances, the automated assistant can render content adjacent to a corresponding object, rather than appearing as over top of the corresponding object. In some implementations, the automated assistant can provide a setting for content to be rendered only after certain conditions are met (e.g., the user has stared at an object of a particular classification for a threshold duration of time). Alternatively, or additionally, settings for the features of augmented reality content can be determined automatically using one or more heuristic processes and/or one or more trained machine learning models, as the user interacts with the automated assistant and/or the computerized glasses.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
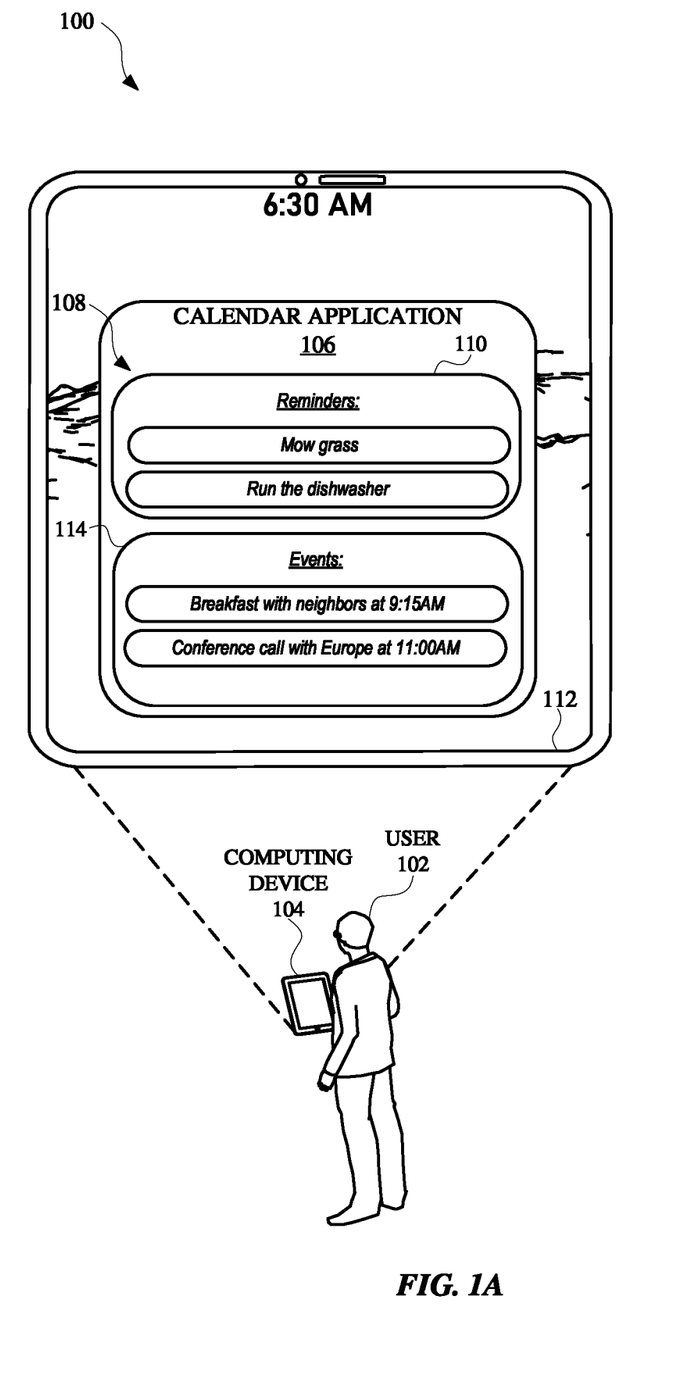
FIG. 1A, FIG. 1B, and FIG. 1C illustrate views of an automated assistant rendering content for a user according to whether certain object(s) in a field of view of computerized glasses relate to application content previously accessed by the user.
Figure 1B:
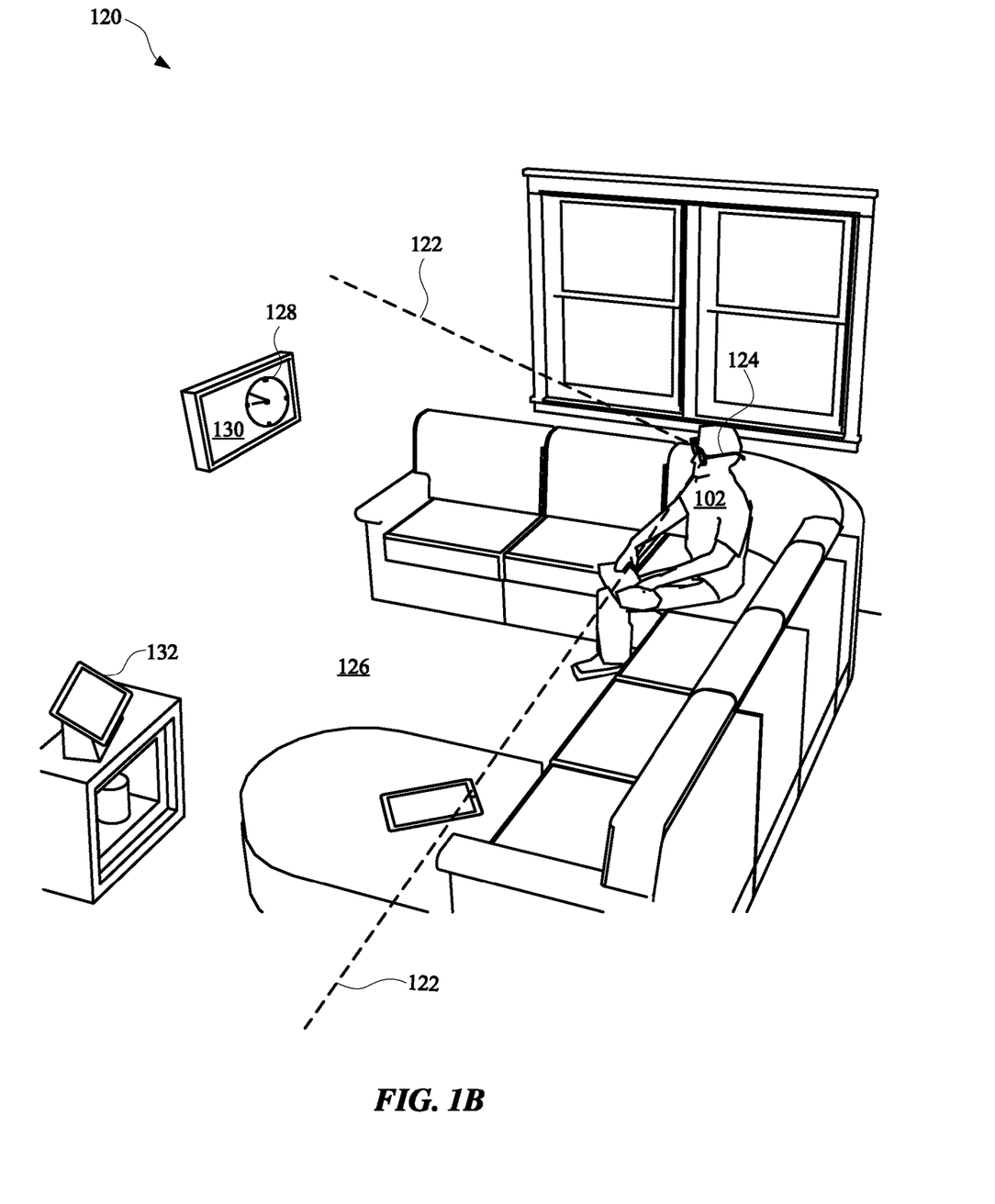
Figure 1C:
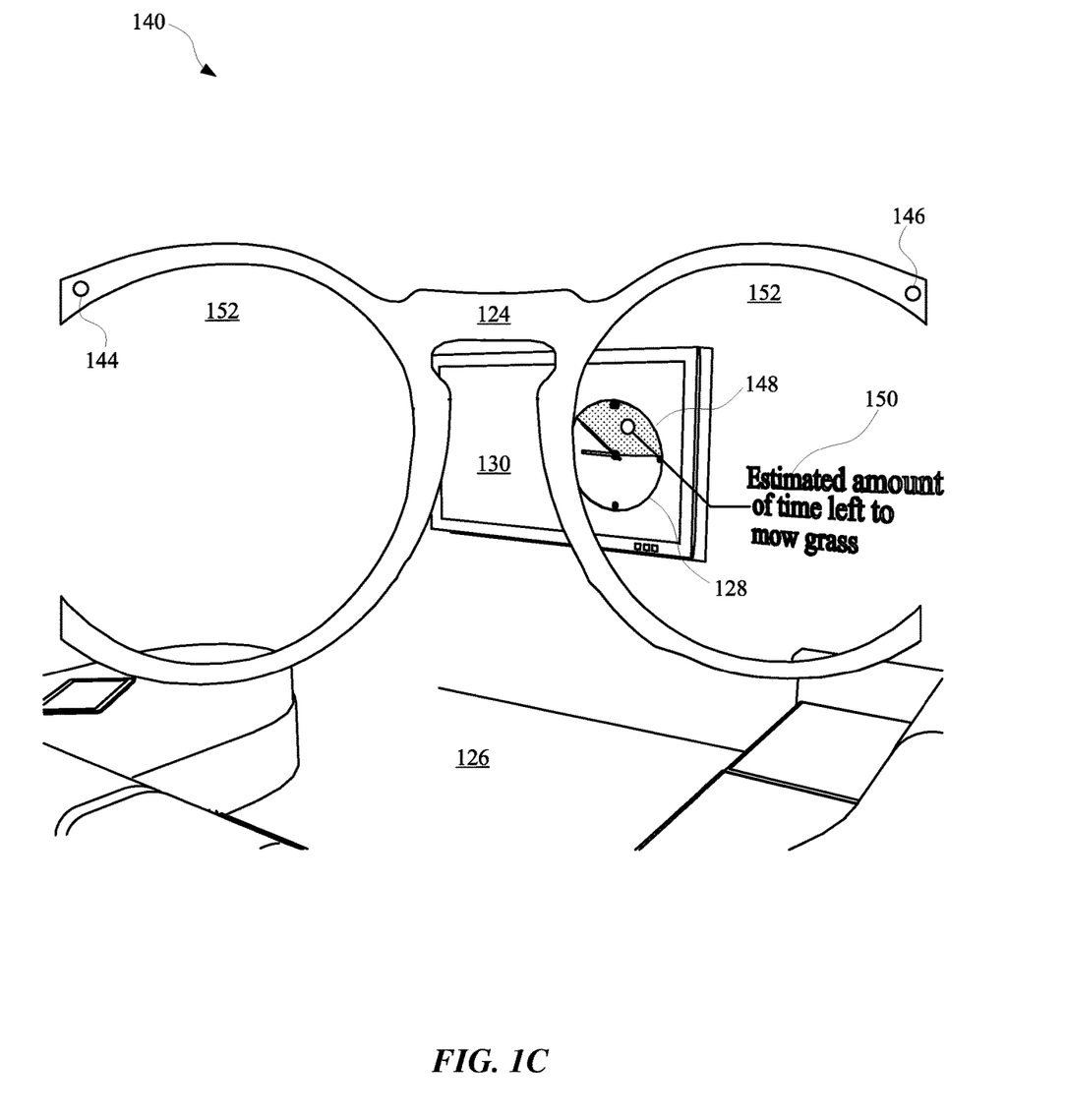

FIG. 1A, FIG. 1B, and FIG. 1C illustrate a view 100, a view 120, and a view 140 of an automated assistant rendering content for a user 102 according to whether certain objects in a field of view of computerized glasses relate to application content previously accessed by the user 102. As illustrated in view 100 of FIG. 1A, the user 102 can be interacting with an application, such as a calendar application 106, to access certain application content 108. For example, the application content 108 can include reminders 110 and events 114 that the user 102 may want to be reminded of throughout their day. As provided in FIG. 1A, the user 102 can be accessing the calendar application 106 in the morning (e.g., 6:30 AM), or otherwise, prior to the events of their current day. In some implementations, the application content can be processed using one or more heuristic processes and/or one or more trained machine learning models to generate entries that correlate portions of the application content to certain objects in the physical world.

For example, the application content rendered at a display interface 112 of a computing device 104 can be processed to identify objects that can be associated with the content. In some instances, because the application content includes times for events, data entries can be created that correlate time-related objects (e.g., watches, wall clocks, timers, etc.) to words and/or phrases provided in the application content. For example, an entry can be generated for correlating the phrase "mow grass" with a classification of objects such as time-keeping objects, at least based on the time indicators (e.g., "9:15 AM," "11:00 AM," etc.) also being in the application content. Alternatively, or additionally, another entry can be generated for correlating the word "breakfast" with a classification of objects that have a European theme, at least based on the event "Conference call with Europe" also being in the application content.

In some implementations, other post-processing can be performed to generate assistant data from the entries. The assistant data can include, for example, natural language content and/or images that can assist the user in certain circumstances. For example, an amount of time to complete the task of mowing grass can be estimated and compared to other information conveyed by the calendar application. Based on this comparison, the assistant data can be generated to convey information to the user regarding when the user 102 could fit "mowing grass" into their schedule. Alternatively, or additionally, information that may be relevant to the "Conference call with Europe" event can be predicted, and sources of the information can be identified. Based on these sources, the assistant data can be generated to convey the sources of the information to the user 102 as a reminder, prior to the "Conference call" event.

For example, and as illustrated in view 120 of FIG. 1B, the user 102 can be wearing computerized glasses 124 that can include one or more sensors and/or one or more interfaces for rendering content to the user 102. The user 102 can be in their living room 126, subsequent to viewing the calendar application 106. When the user 102 is in their living room 126, the user 102 can view various objects such as another computing device 132 and/or a wall clock 130, which can provide an analog clock face 128. When the user 102 is viewing the clock face 128, the clock face 128 can be in a field of view 122 of the computerized glasses 124. Sensor data from the one or more sensors of the computerized glasses 124 can be processed to determine the objects, and/or classification of the objects, within the field of view 122 of the computerized glasses. For example, one or more object recognition models and/or other trained machine learning models can be used to process the sensor data in furtherance of determining identifiers for the objects within the field of view 122. Identifiers for the objects can then be compared to any entries that correlate object identifiers to application content, and/or other data that has been generated based on application content.

For example, and as illustrated in FIG. 1B, the user 102 can be viewing the analog clock face 128, which can be characterized by the automated assistant as having a "clock" classification. The automated assistant can then determine whether any entries associate objects having a clock classification to any content. For example, the automated assistant can determine that the clock is associated with an entry that correlates time tracking devices with an amount of time that the user 102 may have to mow the grass. Based on this determination, the automated assistant can use the assistant data associated with the entry to render helpful information at a display interface of the computerized glasses 124. The information that is rendered can be augmented reality content that can be rendered at a location within the field of view 122 of the computerized glasses 124 according to where a particular object is located within the field of view 122 of the computerized glasses 124.

For example, and as illustrated in FIG. 1C, the automated assistant can cause a display interface 152 of the computerized glasses to render content at or near the object that is determined to be associated with the entry and/or application content. For example, the content can include one or more images and/or one or more portions of natural language content. As illustrated in view 140, the one or more images can include a shape 148 that indicates an amount of time the user 102 may have to complete the task of mowing the grass before the upcoming event indicated in the application content 108. Alternatively, or additionally, one or more portions of natural language content rendered at the display interface 152 can include a phrase 150 such as, "Amount of time left to mow the grass." The content rendered at the display interface 152 can be rendered based on sensor data generated by one or more sensors of the computerized glasses 124, such as a camera 144, microphone 146, and/or any other sensor that can communicate with a computing device.

For example, a location of the analog clock face 128 can be determined based on sensor data, and the shape 148 can be rendered at that location such that the shape 148 at least partially overlaps the analog clock face 128. Alternatively, or additionally, the phrase 150 can be rendered to be adjacent to the analog clock face 128 with an optional "callout" line that can indicate the phrase 150 is associated with the analog clock face 128. In some implementation, features of the shape 148 and/or the phrase 150 can be based on features of a context of the user 102. For example, an opacity, angle, font, size, and/or any other feature of the content rendered at the display interface 152 can be selected based on a number of other objects, and/or physical attributes of the other objects, that may be present in the field of view 122 of the computerized glasses 124.

In some implementations, the rendered content can be selectable via one or more inputs and/or input gestures. A selection of the rendered content via a user input can cause the automated assistant to interact with a separate application that can be the basis for the rendered content. For example, the user 102 can provide a gesture (e.g., a swiping away of the phrase 150) to indicate the user 102 is not interested in information conveyed by the phrase 150. In response to this gesture, the automated assistant can cause the "mow grass" reminder of the reminders 110 to be removed from the reminders 110 of the calendar application 108. Alternatively, or additionally, the user 102 can provide a gesture (e.g., a finger press and drag) to cause the shape 148 to move to a different portion of the analog clock face 128, and cause the shape 148 to move from the original position (e.g., covering 8:50 AM to 9:15 AM) to a different position (e.g., covering 12:00 PM to 12:45 PM). In response to this gesture, the automated assistant can interact with the calendar application 106 to cause the "mow grass" reminder to be rendered at an interface of the computing device 104 and/or another computing device at 12:00 PM or any other time associated with the different position.

Figure 2:
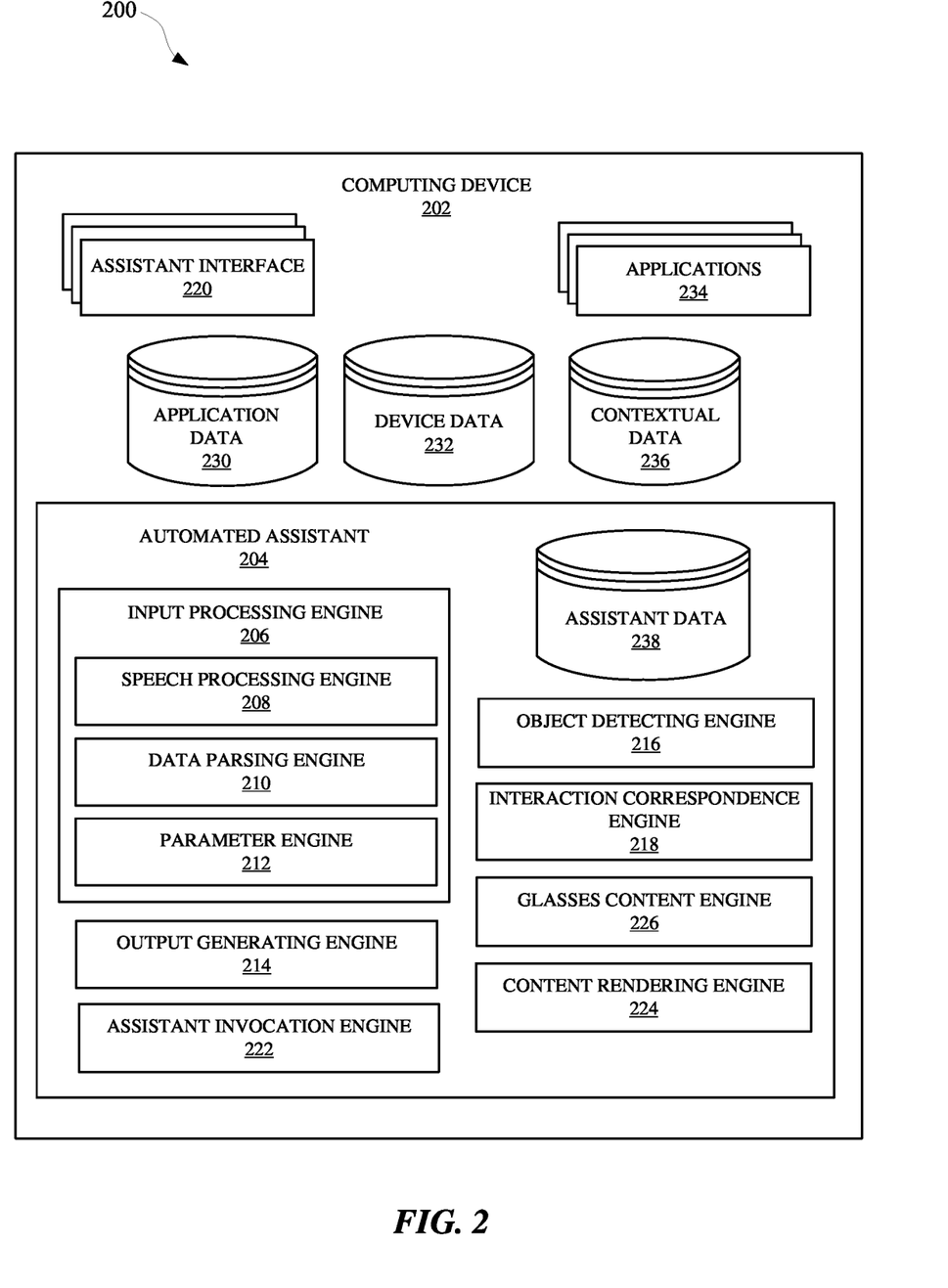
FIG. 2 illustrates a system that facilitates an automated assistant that can provide augmented reality content, via a display interface of computerized glasses, resulting from post-processing of application content.

FIG. 2 illustrates a system 200 that facilitates an automated assistant 204 for providing augmented reality content, via a display interface of computerized glasses, resulting from post-processing of application content. The system 200 can include a computing device 202, which can be computerized glasses, and/or interface with computerized glasses, to provide access to an automated assistant 204. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include an object detecting engine 216 that can process sensor data from one or more sensors of computerized glasses and/or any other device to determine whether a particular object, and/or a particular classification of object, is within a field of view of the computerized glasses. The object detecting engine 216 can determine whether certain objects are present in the field of view using one or more heuristic processes and/or one or more trained machine learning models. For example, various models for detecting various types of objects can be employed to identify certain objects that may be within the field of view of the computerized glasses and/or the user. When an object is identified, an entry can be generated and/or identified for correlating the object with any content that a user may have accessed that is associated with the object and/or object classification.

For example, the system 200 can include an interaction correspondence engine 218 that can generate entries for correlating certain instances of data, such as application content, with an object and/or object classification. The entries can thereafter be utilized to determine whether to render assistant content at a display interface of the computerized glasses, in furtherance of assisting the user with certain tasks and/or other endeavors. For example, the automated assistant can process content being accessed by the user (e.g., when the user is writing an email), with prior permission from the user, to determine classifications of objects that may be relevant to the content. Alternatively, or additionally, other sources of content can be identified for determining the assistant content that should be rendered for the user in response to the user viewing a particular object. For example, calendar data from a calendar application can be processed in combination with email data, with prior permission from the user, in furtherance of generated content that can be rendered to the user to assist the user with preparing for an event stored by the calendar in association with the email. Thereafter, when the user views an object associated with the email data, automated assistant 204 can cause the content to be rendered at a display interface of the computerized glasses.

In some implementations, the system 200 can include a glasses content engine 226 that can generate content for rendering at a display interface of computerized glasses and/or any other interface of a computing device. For example, one or more trained machine learning models (e.g., a deep learning neural network model) can be utilized to generate content, that may be helpful in certain contexts, from one or more instances of data associated with a user. In some instances, the generated content can include images, videos, audio, words, and/or phrases that can proactively assist the user with realizing data that may be helpful in certain contexts. In some implementations, historical interactions between the user and the automated assistant 204 can be processed, with prior permission from the user, by the glasses content engine 226 to determine requests that the user may be expected to make to the automated assistant 204 in certain contexts. Based on this processing, the glasses content engine 226 can generate assistant data that characterizes responses to certain requests that may be based on application content available to the user and/or one or more objects that may be in a field of view of the computerized glasses. In some implementations, the glasses content engine 226 can update the assistant data in real-time according to information that is accessible to the automated assistant. For example, when content is being rendered at a display interface of the computerized glasses (e.g., a virtual invite rendered to overlay a portion of a physical calendar), and an email is received that is associated with the content (e.g., an email that delays the virtual event), the content can be updated to reflect the change indicated in the body of the email.

In some implementations, the system 200 can include a content rendering engine 224 that can process the assistant data to generate content that can be rendered at one or more interfaces of the computerized glasses. In some implementations, the content rendering engine 224 can generate the content based on physical attributes of the object that is at least part of the basis for the content being rendered. For example, a geographic location of the object can serve as a basis for rendering the content. The geographic location can be identified in, and/or otherwise associated with, the application content that the user previously accessed and, when the user is within a threshold distance of the geographic location, the content can be rendered at the computerized glasses. Alternatively, or additionally, the content can be rendered when the object is viewed within a threshold duration of time between the user interacting with the application content (e.g., writing a report on their word processing application) and viewing the object.

In some implementations, the content rendering engine 224 can render the content at a location of the display interface of the computerized glasses based where the object is within the field of view of the computerized glasses. Alternatively, or additionally, the content rendering engine 224 can select features of the content according to physical attributes of the object. For example, a size of the content to be rendered can be selected based on a distance of the object from the user and/or a size of the object within the field of view of the computerized glasses. Alternatively, or additionally, the content can be rendered to supplement and/or complement information that may already be conveyed by the object. For example, when the content to be rendered relates to a calendar event, and the object is a calendar, the content rendering engine 224 can bypass rendering a "date" portion of the content because the calendar may already include dates. Rather, the content can be rendered at a location of the physical calendar corresponding to the date of the calendar event, and the amount of content rendered can depend on an amount of white space, or other area having a threshold degree of color uniformity. In some implementations, when a particular object embodies a threshold degree of color uniformity (e.g., a majority of the area of the object is a single color), the content rendering engine 224 can select to render the content to overlap a majority (e.g., at least half) of the object. However, if the particular object does not embody a threshold degree of color uniformity (e.g., less than a majority of the area of the object is not a single color), the content rendering engine 224 can select to render the content at a location within the field of view that is adjacent to the location of the object and/or otherwise does not overlap the object.

Figure 3:
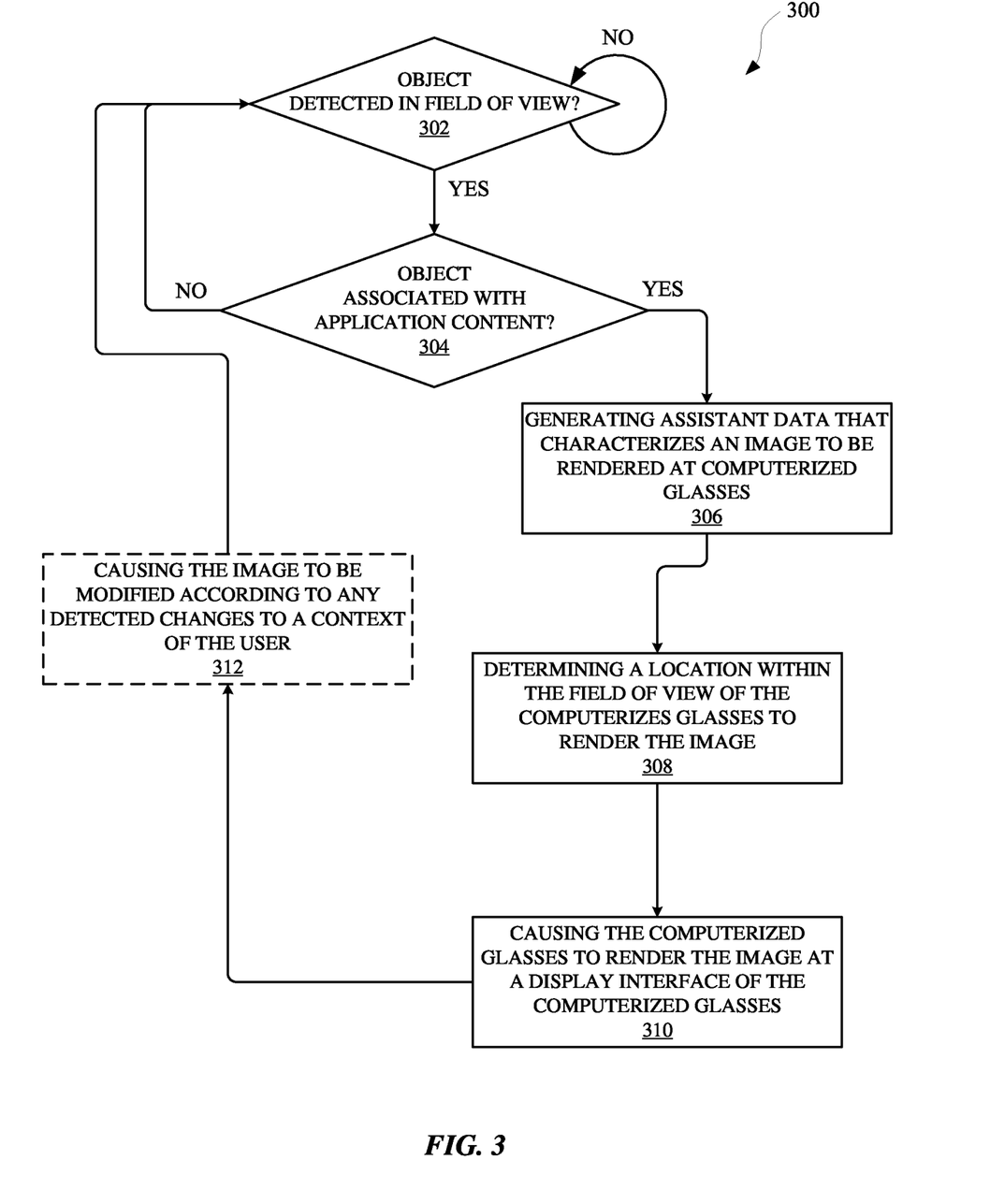
FIG. 3 illustrates a method for causing certain content to be rendered at an interface of computerized glasses when an object, having a particular object classification, is determined to be within a field of view of the computerized glasses, and the object classification is determined to be associated with a prior interaction between a user and an application.

FIG. 3 illustrates a method 300 for causing certain content to be rendered at an interface of computerized glasses when an object, having a particular object classification, is determined to be within a field of view of the computerized glasses, and the object classification is determined to be associated with a prior interaction between a user and an application. The method 300 can be performed by one or more computing devices, applications, and/or any other apparatus or module that can be associated with an automated assistant. The method 300 can include an operation 302 of determining whether an object is detected within a field of view of computerized glasses being worn by a user. The computerized glasses can provide access to, and/or otherwise operate as an interface for, an automated assistant that can be responsive to user inputs and/or gestures. The computerized glasses can include one or more sensors for generating sensor data that can be processed to determine features of a context of a user, such as whether the user is providing an input, whether a particular object is within a field of view of the user, and/or a position of the user relative to objects and/or context of the user. The computerized glasses can also include one or more interfaces for rendering content for the user, such as at a transparent display interface of the computerized glasses, thereby allowing the user to view their surroundings and any content of the display interface.

In some implementations, an object can be detected in a field of view of the computerized glasses, or out of the field of view of the computerized glasses, based on processing sensor data from one or more sensors of the computerized glasses. Sensor data from the one or more sensors can be processed using one or more heuristic processes and/or one or more trained machine learning models in furtherance of detecting and classifying objects characterized by the sensor data. For example, the user can be wearing the computerized glasses while in a lunch meeting, and a plate of food can be detected as an object within the field of view of the user. When an object is detected, the method 300 can proceed from the operation 302 to an operation 304.

The operation 304 can include determining whether the object is associated with application content, which may be associated with the user that is wearing the computerized glasses. In some implementations, determining whether the object and/or object classification is associated with the application content can be performed using one or more heuristic processes and/or one or more trained machine learning models. For example, object data characterizing the object can be processed, using one or more trained machine learning models, to generate an object embedding that can be mapped to a latent space, and the latent space can include entry embeddings. The entry embeddings can be generated from entries that have been generated by the automated assistant and/or another application for correlating certain application content to certain objects and/or object classifications. For example, an entry embedding can correspond to an entry that associates an upcoming dinner reservation with food objects. Therefore, when the object embedding corresponding to the plate of food is mapped to the latent space, the object embedding can be mapped within a threshold distance of the entry embedding, thereby exhibiting an association between the object embedding and the entry embedding.

When the object is determined to be associated with application content, the method 300 can proceed from the operation 304 to an operation 306. Otherwise, the method 300 can return to the operation 302 as the user continues to wear the computerized glasses. The operation 306 can include generating assistant data that characterizes an image to be rendered at the computerized glasses. In some implementations, the assistant data can be generated prior to the object being within the field of view of the computerized glasses. In some implementations, the assistant data can be generated using one or more heuristic processes and/or one or more trained machine learning models. For example, when the object is the plate of food being provided at a lunch meeting, and the application content includes an upcoming dinner reservation, the assistant data can be generated to convey helpful information to the particular user.

In some implementations, additional context can be considered when generating the assistant data. For example, application content from a variety of different sources can be used as a basis for generating the assistant data. Another source for application content can be, for example, a health application for tracking nutrients that the user consumes each day. The assistant data that is generated from application content of the health application can convey information such as, suggestions for a menu item to select at the subsequent dinner reservation, in furtherance of assisting the user with reaching their daily nutrient goal, assuming the user consumes the plate of food at the lunch meeting. In this way, certain information can be deduced from the detected object and used, in combination with one or more sources of application content, to generate assistant data that can convey further helpful information.

In some implementations, assistant data that is generated can include one or more images, natural language content, and/or any other content that can convey information to the user. For example, when the assistant data is generated to suggest a menu item to select for the upcoming dinner reservation, the assistant data can characterize an image of the menu item captured from a website for the restaurant having the dinner reservation. Alternatively, or additionally, the assistant data can provide natural language content that identifies the menu item(s), and indicates the purpose for the automated assistant suggesting the menu item (e.g., "If you finish this lunch meal, you should select the Vegetable Curry at the dinner at Ramsi's tonight to reach your nutrient goal for today."). In some implementations, the assistant data can be generated based on prior interactions between the user and the automated assistant. For example, the assistant data can be generated to provide information that the user might otherwise expressly request from the automated assistant based on the context. For instance, the user may have previously accessed their health application to determine what they should eat for dinner based on what they are currently eating for lunch. During the interaction with the health application, the user may have solicited their automated assistant to provide suggestions on what to eat for dinner (e.g., "Show me recipes for low carb, high protein dinners."). This prior interaction can be a basis for the automated assistant generating the assistant data regarding the menu items to select for the dinner reservation and/or the nutrients in the lunch meeting plate of food.

The method 300 can proceed from the operation 306 to an operation 308 of determining a location within the field of view of the computerized glass to render the image. In some implementations, the image can be rendered adjacent to the object and/or at least partially overlapping the object. Alternatively, or additionally, the image can be rendered with at least some transparent features, thereby allowing the user to view a portion of the environment behind the image. In some implementations, a selection for the location for rendering the image can be based on the classification of the object, the application content associated with the object, and/or the type of information to be conveyed to the user. For example, images that have meaning because of their placement overlapping the object in the field of view of the computerized glasses can be rendered at a location that causes the images to at least partially overlap the object. Alternatively, or additionally, images that can suitably convey information without the presence of the object can be rendered anywhere within the field of view of the computerized glasses that does not obstruct the view of other objects (e.g., in a space that includes a threshold degree of color uniformity).

In some implementations, at least a portion of the image can be selected for rendering within the field of view of the computerized glasses based on one or more features of a context of the user. For example, an amount of text of the assistant data to be rendered at the display interface of the computerized glasses can be selected based on a distance of the user from the object that is the basis for the assistant data. Alternatively, or additionally, the location for the image can be selected based on a preference of the user, as indicated by settings that are controllable by the user. For example, the user can expressly request that an indication of available assistant data be indicated at a periphery of the field of view of the computerized glasses. When the user adjusts the field of view to include more of the periphery area (e.g., turning their head 90 degrees to their right), the image corresponding to the indication can be fully rendered in the adjusted field of view of the computerized glasses.

The method 300 can proceed from the operation 308 to an operation 310 of causing the computerized glasses to render the image at a display interface of the computerized glasses. The method 300 can optionally proceed from the operation 310 to an operation 312 of causing the image to be modified according to detected changes to a context of the user. For example, the image can be dynamically updated according to changes to the application content that may have occurred since the image was rendered at the display interface of the computerized glasses. For example, a cancelation to the aforementioned dinner reservation, as indicated by calendar application content, can cause the automated assistant to modify the image in real time. As a result, the image can transition from being a suggestion for a menu item to a suggestion for a recipe to cook at home, and/or an indication of the cancelation of the dinner reservation. In some implementations, the image can be selectable via an input to the computerized glasses and/or the automated assistant. Content that is rendered in response to the selection of the image (e.g., a selection of the suggested menu item via a hand gesture captured by a sensor of the computerized glasses) can then be rendered according to objects that may be within the field of view of the user and/or preferences of the user.

Figure 4:
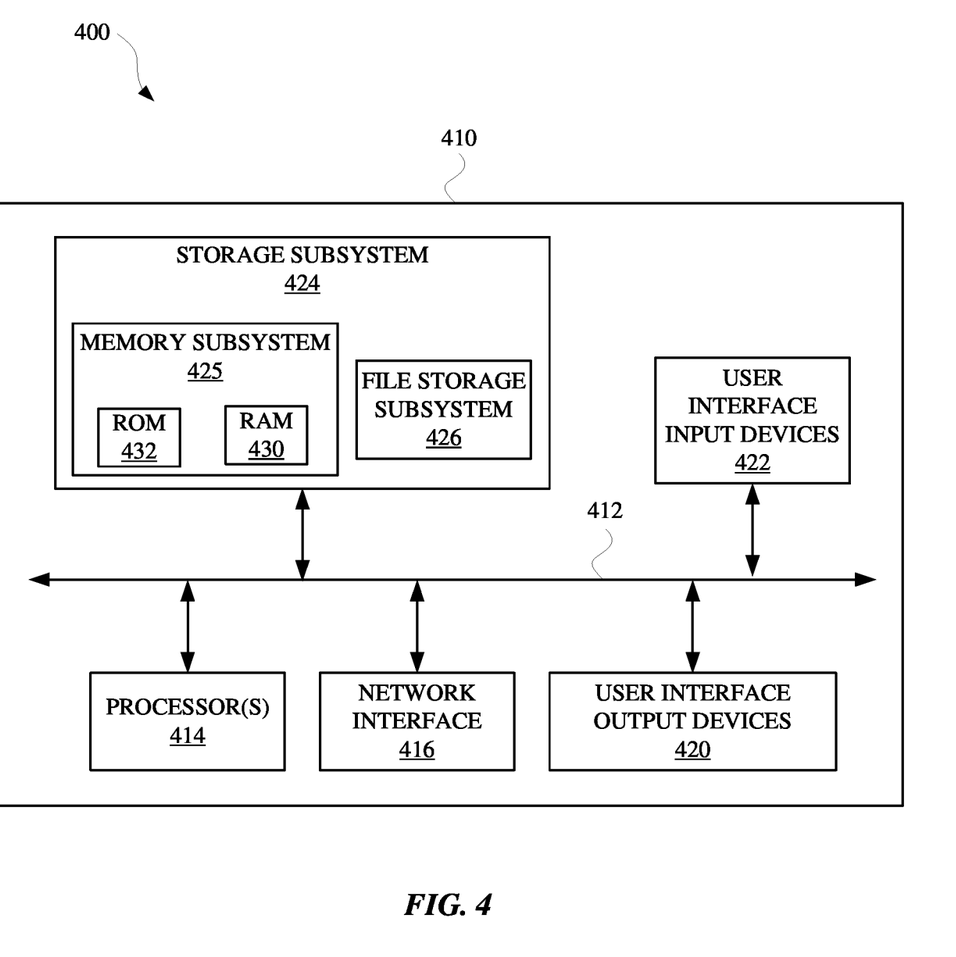
FIG. 4 is a block diagram of an example computer system

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computerized glasses 124, computing device 104, automated assistant, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, based on sensor data, that a field of view of computerized glasses being worn by a user includes an object. The sensor data is generated using one or more sensors that are integral to (e.g., included as a part of) the computerized glasses and/or integral to a separate computing device that communicates with the computerized glasses. The method can further include determining, based on contextual data, that the object is associated with an application that is accessible via the computerized glasses and/or the separate computing device. The contextual data indicates that the user interacted with the application within a threshold duration of time of the object being within the field of view of the computerized glasses. The method can further include generating, based on the object being within the field of view of the computerized glasses, assistant data that characterizes an image for rendering at a display interface of the computerized glasses. The image is rendered to convey information that is based on the user interacting with the application. The method can further include causing, based on the assistant data, the computerized glasses to render the image at the display interface of the computerized glasses when the object is within the field of view of the computerized glasses. The image is rendered at a location, within a field of view of the computerized glasses, that is selected based on where the object is within the field of view of the computerized glasses.

In some implementations, the contextual data further indicates that the user interacted with the application in furtherance of completing a task that is identified by a calendar application that is accessible to the user, and the object includes at least a portion of a calendar. In some implementations, the contextual data further indicates a due date for the task identified by the calendar application, and the location of the image is selected based on where the due date is indicated on the calendar. In some implementations, the contextual data further indicates a due date for the task identified by the calendar application, and a size of the image is selected based on where the due date is indicated on the calendar. In some implementations, the contextual data further indicates a date for an upcoming event identified by the calendar application, and the location of the image is selected to not overlap where the date for the upcoming event is indicated on the calendar. In some implementations, the image is rendered at the location that is further selected based on one or more physical attributes of the object.

In some implementations, the method further includes selecting the location for rendering the image based on a size of the object within the field of view of the computerized glasses. For example, the location can be selected to prevent the image from overlapping a majority of the object within the field of view of the computerized glasses. As another example, the location can be selected to cause the image to be adjacent to the object within the field of view of the computerized glasses. In some implementations, generating the assistant data that characterizes the image is further based on one or more physical attributes of the object. In some implementations, the one or more physical attributes of the object includes a size of an area of the object that exhibits a threshold degree of color uniformity. In some implementations, the information included in the image includes natural language content, and an amount of natural language content to include in the image is selected according to the size of the area of the object that exhibits the threshold degree of color uniformity.

In other implementations, a method implemented by one or more processors is set forth as including operations such as generating, based on interactions of a user with an application on a computing device, an entry that associates content, determined from the interactions, to a classification of physical objects. The method can further include, subsequent to generating the entry that associates the content to the classification of physical objects: determining, based on sensor data generated by one or more sensors of computerized glasses being worn by the user, that a particular physical object is present in a field of view of the computerized glasses, and has the classification of the entry. The method can further include, in response to determining that the particular physical object is present in the field of view of the computerized glasses and has the classification of the entry: causing the content, associated with the classification in the entry, to be rendered at a display interface, of the computerized glasses, such that the content is displayed simultaneous to the particular physical object being in the field of view of the computerized glasses.

In some implementations, the content identifies a geographic location, and causing the computerized glasses to render the content is performed when the user is within a threshold distance of the geographic location. In some implementations, the content includes a selectable element that is selectable via an automated assistant that is accessible via the computerized glasses, and a selection of the selectable element causes the automated assistant to interact with the application. In some implementations, the method can further include determining, based on the sensor data, certain information that is being conveyed by the particular physical object when the physical object is within the field of view of the computerized glasses. In some of those implementations, the content is based on: the certain information being conveyed by the particular physical object, and the interactions between the user and the application. In some implementations, the certain information includes an indication of a current time, and the content includes another indication of an amount of time until an event that is associated with the application.

In yet other implementations, a method implemented by one or more processors is set forth as including operations such as determining, based on sensor data generated by one or more sensors of computerized glasses being worn by a user, that a particular physical object is present in a field of view of the computerized glasses. The method can further include generating, based on the sensor data, an entry that associates the particular physical object with a classification of physical objects. The method can further include, subsequent to generating the entry that associates the particular physical object with the classification of physical objects: determining, based on contextual data associated with the user, that the user is accessing, via a separate computing device or the computerized glasses, application content that is associated with the classification of physical objects. The method can further include determining, subsequent to the user access the application content that is associated with the particular physical object, that the particular physical object, or another physical object having the classification of physical objects, is within the field of view of the computerized glasses. The method can further include causing, based on the contextual data and the particular physical object or other physical object being within the field of view of the computerized glasses, an image associated with the application content to be displayed at a display interface of the computerized glasses.

In some implementations, determining that the particular physical object or the other physical object is within the field of view of the computerized glasses includes: determining that the particular physical object, or the other physical object, is within the field of view of the computerized glasses within a threshold duration of time from the user accessing the application content. In some implementations, determining that the particular physical object or the other physical object is within the field of view of the computerized glasses includes: determining that the particular physical object or the other physical object is within the field of view of the computerized glasses within a duration of time specified by the user for receiving notifications corresponding to the classification of physical objects. In some implementations, the image is selectable via an interface of the computerized glasses, and a selection of the image by the user causes the application content to be edited via the computerized glasses or the separate computing device.

I claim:

1. A method implemented by one or more processors, the method comprising:
   determining, based on sensor data generated by one or more sensors of computerized glasses being worn by a user, that a particular physical object is present in a field of view of the computerized glasses;
   generating, based on the sensor data, an entry that associates the particular physical object with a classification of physical objects;
   subsequent to generating the entry that associates the particular physical object with the classification of physical objects:
      determining, based on contextual data associated with the user, that the user is accessing, via a separate computing device or the computerized glasses, application content that is associated with the classification of physical objects;

determining, subsequent to the user accessing the application content that is associated with the particular physical object, that the particular physical object, or another physical object having the classification of physical objects, is within the field of view of the computerized glasses within a duration of time specified by the user for receiving notifications corresponding to the classification of physical objects; and causing, based on the contextual data and the particular physical object or other physical object being within the field of view of the computerized glasses, an image associated with the application content to be displayed at a display interface of the computerized glasses.

2. The method of claim 1, wherein determining that the particular physical object or the other physical object is within the field of view of the computerized glasses includes:

determining that the particular physical object, or the other physical object, is within the field of view of the computerized glasses within a threshold duration of time from the user accessing the application content.

3. The method of claim 1, wherein determining the application content that is associated with the classification of physical objects includes:

determining, during an interaction between the user and the application and based on the contextual data associated with the user, that the user is accessing, via the separate computing device or the computerized glasses, the application content that is of the application and that is associated with the classification of physical objects, and wherein the image to be displayed at the display interface of the computerized glasses is different from the application content.

4. The method of claim 1, wherein the image is selectable via an interface of the computerized glasses, and a selection of the image by the user causes the application content to be edited via the computerized glasses or the separate computing device.

5. The method of claim 1, wherein the duration of time specified by the user includes one or more times of a day.

6. The method of claim 1, wherein the duration of time specified by the user includes one or more days of a week.

7. The method of claim 1, wherein the duration of time specified by the user includes one or more times of one or more days of a week.

8. Computerized glasses comprising:
one or more sensors;
a display interface;
memory storing instructions; and
one or more processors operable to execute the instructions to:
determine, based on sensor data generated by one or more of the sensors, that a particular physical object is present in a field of view of the computerized glasses;
generate, based on the sensor data, an entry that associates the particular physical object with a classification of physical objects;
subsequent to generating the entry that associates the particular physical object with the classification of physical objects:

determine, based on contextual data associated with the user, that the user is accessing, via a separate computing device or the computerized glasses, application content that is associated with the classification of physical objects;

determine, subsequent to the user accessing the application content that is associated with the particular physical object, that the particular physical object, or another physical object having the classification of physical objects, is within the field of view of the computerized glasses within a duration of time specified by the user for receiving notifications corresponding to the classification of physical objects; and cause, based on the contextual data and the particular physical object or other physical object being within the field of view of the computerized glasses, an image associated with the application content to be displayed at the display interface of the computerized glasses.

9. The computerized glasses of claim 8, wherein in determining that the particular physical object or the other physical object is within the field of view of the computerized glasses one or more of the processors are to:

determine that the particular physical object, or the other physical object, is within the field of view of the computerized glasses within a threshold duration of time from the user accessing the application content.

10. The computerized glasses of claim 8, wherein in determining the application content that is associated with the classification of physical objects one or more of the processors are to:

determine, during an interaction between the user and the application and based on the contextual data associated with the user, that the user is accessing, via the separate computing device or the computerized glasses, the application content that is of the application and that is associated with the classification of physical objects, and wherein the image to be displayed at the display interface of the computerized glasses is different from the application content.

11. The computerized glasses of claim 8, wherein the image is selectable via an interface of the computerized glasses, and a selection of the image by the user causes the application content to be edited via the computerized glasses or the separate computing device.

12. The computerized glasses of claim 8, wherein the duration of time specified by the user includes one or more times of a day.

13. The computerized glasses of claim 8, wherein the duration of time specified by the user includes one or more days of a week.

14. The computerized glasses of claim 8, wherein the duration of time specified by the user includes one or more times of one or more days of a week.

15. A non-transitory computer-readable medium comprising:
memory storing instructions; and
one or more processors operable to execute the instructions to:
determine, based on sensor data generated by one or more sensors of computerized glasses being worn by a user, that a particular physical object is present in a field of view of the computerized glasses;

generate, based on the sensor data, an entry that associates the particular physical object with a classification of physical objects;

subsequent to generating the entry that associates the particular physical object with the classification of physical objects:

determine, based on contextual data associated with the user, that the user is accessing, via a separate computing device or the computerized glasses, application content that is associated with the classification of physical objects;

determine, subsequent to the user accessing the application content that is associated with the particular physical object, that the particular physical object, or another physical object having the classification of physical objects, is within the field of view of the computerized glasses within a duration of time specified by the user for receiving notifications corresponding to the classification of physical objects; and cause, based on the contextual data and the particular physical object or other physical object being within the field of view of the computerized glasses, an image associated with the application content to be displayed at a display interface of the computerized glasses.

16. The non-transitory computer-readable medium of claim 15, wherein in determining that the particular physical object or the other physical object is within the field of view of the computerized glasses one or more of the processors are to execute the instructions to:

determining that the particular physical object, or the other physical object, is within the field of view of the computerized glasses within a threshold duration of time from the user accessing the application content.

17. The non-transitory computer-readable medium of claim 15, wherein in determining the application content that is associated with the classification of physical objects one or more of the processors are to execute the instructions to:

determining, during an interaction between the user and the application and based on the contextual data associated with the user, that the user is accessing, via the separate computing device or the computerized glasses, the application content that is of the application and that is associated with the classification of physical objects, and wherein the image to be displayed at the display interface of the computerized glasses is different from the application content.

18. The non-transitory computer-readable medium of claim 15, wherein the image is selectable via an interface of the computerized glasses, and a selection of the image by the user causes the application content to be edited via the computerized glasses or the separate computing device.

19. The non-transitory computer-readable medium of claim 15, wherein the duration of time specified by the user includes one or more times of a day.

20. The non-transitory computer-readable medium of claim 15, wherein the duration of time specified by the user includes one or more days of a week.

* * * * *